(12) United States Patent
Yeon

(10) Patent No.: US 6,817,507 B2
(45) Date of Patent: Nov. 16, 2004

(54) CAPSTAN MOTOR FOR MAGNETIC RECORDING AND REPRODUCING APPARATUS

(75) Inventor: Eui-Jung Yeon, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/271,593

(22) Filed: Oct. 17, 2002

(65) Prior Publication Data

US 2003/0076614 A1 Apr. 24, 2003

(30) Foreign Application Priority Data

Oct. 18, 2001 (KR) .......................................... 2001-64457

(51) Int. Cl.[7] ................................................. H02K 7/10
(52) U.S. Cl. ............. 226/188; 310/156.04; 310/156.38; 310/156.45; 310/156.46; 310/156.47; 310/90.5
(58) Field of Search .......................... 226/188; 310/262, 310/156.04, 156.38, 156.45, 156.46, 156.47, 90.5

(56) References Cited

U.S. PATENT DOCUMENTS

| | | | | |
|---|---|---|---|---|
| RE30,761 E | * | 10/1981 | Ban et al. ................... | 310/202 |
| 4,329,636 A | * | 5/1982 | Uchida et al. ............... | 310/268 |
| 5,721,460 A | * | 2/1998 | Ushiro ........................ | 310/166 |
| 6,215,210 B1 | * | 4/2001 | Hashimoto .................... | 310/42 |
| 6,417,587 B1 | * | 7/2002 | Komatsu et al. .......... | 310/68 B |
| 2002/0047361 A1 | * | 4/2002 | Naito et al. ............... | 310/68 R |
| 2003/0161559 A1 | * | 8/2003 | Kurobe et al. ................ | 310/90 |

* cited by examiner

Primary Examiner—Kathy Matecki
Assistant Examiner—Sang Kim
(74) Attorney, Agent, or Firm—Birch, Stewart, Kolasch & Birch, LLP

(57) ABSTRACT

A capstan motor for a magnetic recording and reproducing apparatus includes a stator having a coil disposed on outer peripheral direction thereof, and a rotor having a magnet to correspond to coil and rotated by an electromagnetic interaction between the coil and the magnet. A capstan shaft is rotated integrally with the rotor, is fixed on the rotor and installed so that one side of the capstan shaft is cohered with a pinch roller taking a tape therebetween to drive the tape with the pinch roller. The magnet has a predetermined shape and is provided to apply magnetic force of the magnet eccentrically for an electromagnetic force generated on the coil so that a predetermined thrust can be applied to the capstan shaft toward one direction between upper and lower directions of the shaft direction.

13 Claims, 4 Drawing Sheets

CAPSTAN MOTOR FOR MAGNETIC RECORDING AND REPRODUCING APPARATUS

BACKGROUND OF THE INVENTION

1. Field of the Invention

The present invention relates to a capstan motor for a magnetic recording and reproducing apparatus, and particularly, to a capstan motor which is able to maintain driving height of a tape by preventing a capstan shaft from being vibrated in length direction.

2. Description of the Background Art

Generally, in a magnetic recording and reproducing apparatus, a magnetic tape drives at a constant speed by being inserted between a capstan shaft and a pinch roller which is cohered with the capstan shaft in recording mode and reproducing mode. The capstan shaft is driven by a capstan motor having it as a rotating shaft. The capstan motor is a motor which can be rotated forward and backward, and it can change it's speed from a normal speed for recording and reproducing modes, that is, general function, to a low speed for a long time recording and reproducing or for a slow mode for reproducing slow motion, that is, for special functions.

Principal parts of the magnetic recording and reproducing apparatus will be described with reference to FIG. 1 as follows.

FIG. 1 is a block diagram showing a tape drive of a general magnetic recording and reproducing apparatus.

In the tape drive of the magnetic recording and reproducing apparatus, a tape 1 which is wound off from a feed reel (not shown) of a tape cassette contacts to a full width erase head 5 for erasing all video and voice control signals recorded on the tape 1 when the tape 1 is in the recording mode, to a video head drum 6 for recording/reproducing video signals, to an audio head 7 for recording/reproducing voice signals, to a control head 8 for recording/reproducing control signal on the tape so that the tape 1 can be driven in a constant speed, and then, wound on a take-up reel (not shown) of the tape cassette.

Herein, a feed reel driving unit 3 and a take-up reel driving unit 4 are installed on one side of a main chassis 2 so as to drive the feed reel and the take-up reel.

Also, a plurality of guide posts 12, 14, 16 and 18 for guiding the driving of the tape 1, and guide rollers of feed side and of take-up side 20 and 22 for supporting the tape 1 and for making the tape draw a natural trajectory are installed on the main chassis 2.

In addition, a tension post 26 for controlling tensile force in driving the tape 1 is installed on a tension arm 24. The tension arm 24 is elastically supported by a spring 29 so as to be rotated as a predetermined angle centering around a shaft pin 28 according to the tensile force of the tape 1.

In addition, a tension brake 27 having both ends fixed on the tension arm 24 respectively is wound on the feed reel driving unit 3, and the tension brake 27 controls the tension of the tape 1 by controlling the rotating speed of the feed reel driving unit 3 according to operations of the tension arm 24.

On the other hand, slant bases for feed side and for take-up side 36 and 38 are installed on both sides of the video head 6 so as to wind the tape 1 on the video head 6, and slant posts for feed side and for take-up side 42 and 44 for guiding the tape 1 toward the video head surface are installed on the slant bases for feed side and for take-up side 36 and 38.

Also, loading paths 32 and 34 for guiding the slant bases for feed side and for take-up side 36 and 38 when the slant bases are moved are formed on both sides of the video head 6.

That is, the tape 1 is guided by the slant posts 42 and 44, then pulled toward the video head 6 when the slant bases 36 and 38 are moved along with the loading paths 32 and 34, and wound on the video head 6.

In the magnetic recording and reproducing apparatus constructed as above, the capstan motor 50 and the pinch roller 54 for making the tape 1 drive are disposed, and the capstan motor 50 will be described with reference to FIGS. 2A and 2B as follows.

The capstan motor 50 comprises a rotor 47 and a stator 48, and the rotor 47 comprises a rotor case 58, a magnet 60 fixedly attached on a periphery of the rotor case 58 for forming a magnetic field required to rotate the capstan motor 50, a pulley 72 fixed on lower center of the rotor case 58 and rotated integrally with the rotor case 58 for driving reel rotation of the magnetic tape, and a capstan shaft 52 fixedly press-fitted on a center of the pulley 72 and cohered with the pinch roller 54 taking the tape 1 therebetween.

Herein, the capstan shaft 52 is an output shaft of the capstan motor 50, and the proceeding direction of the tape 1 is decided by the rotating direction of the capstan shaft 52.

The stator 48 comprises a frame 66 having bearings 64 installed respectively on inner upper and inner lower sides thereof for supporting the rotation of the capstan shaft 52 and a substrate 70 fixed thereon with a coupling bolt 68, and an armature coil 62 fixed to face the magnet 60 of the rotor 47 on the periphery of the frame 66 for rotating the rotor 47 by electromagnetic interaction with the magnet 60.

Operation of the capstan motor 50 of the conventional magnet recording and reproducing apparatus constructed as above will be described as follows.

When electric power is applied to the coil 62, electric force is generated on the coil 62, and the rotor 47 is rotated by the electromagnetic interaction between the electric force and the magnet 60.

That is, the rotor 58 is rotated according to that the direction of the magnetic force (fm) of the magnet 60 and the direction of the electromagnetic force (fc) of the coil 62 function vertically to the shaft direction of the capstan shaft 52.

At that time, the magnetic force (fm) of the magnet 60 and the electromagnetic force (fc) of the coil 62 are not functioned toward the shaft direction of the capstan shaft 52, and therefore, there is no component of the capstan shaft direction in a resultant force of the magnetic force (fm) and of the electromagnetic force (fc).

In addition, the capstan shaft 52 and the pinch roller 54 are cohered with each other taking the tape 1 therebetween to compress the tape 1, and these are rotated by the rotating force of the capstan motor 52 to make the tape 1 drive at a constant speed with a constant tensile force.

The capstan motor 50 constructed and operated as above is vibrated in up-and-down direction by outer elements such as mechanical vibration due to the rotation of the rotor 58 and run-out of the pinch roller generated when the capstan shaft 52 is selectively cohered to the pinch roller 54.

That is, thrust F1, F2 and F3 are functioned to the capstan shaft 52, to the tape 1, and to the pinch roller 54 respectively in the shaft direction of the capstan shaft 52, and therefore, the capstan shaft 52 is changed toward the shaft direction due to the thrusts, and accordingly, the tape 1 is vibrated in up-and-down direction and traveling height is changed.

In detail, since a frictional force between the pinch roller 54 and the tape 1 is greater than that between the capstan shaft 52 and the tape 1, the tape 1 is a lot affected by the thrust F2 of the pinch roller 54, and the thrust F2 of the pinch roller 54 is applied forward an opposite direction of the thrust F1 of the capstan shaft 52. Therefore, in case that the capstan shaft 52 vibrates by a mechanical vibration according to rotation of the rotor 58 or the pinch roller 54 vibrates by exterior factors such as the run out of the pinch roller 54, the tape 1 vibrates in the same direction of the pinch roller 54, thereby changing the traveling height of the tape 1.

Therefore, when the tape 1 contacts to the video head 6, to the audio head 7, and to the control head 8, etc., the contacting status becomes bad, and therefore, the signal recording and reproducing on the tape 1 are not made precisely.

SUMMARY OF THE INVENTION

Therefore, an object of the present invention is to provide a capstan motor for a magnetic recording and reproducing apparatus which is able to drive a tape stably by applying a predetermined thrust to a shaft direction of a capstan shaft to restrain vibrations of the capstan shaft in length direction.

To achieve the object of the present invention, as embodied and broadly described herein, there is provided a capstan motor for a magnetic recording and reproducing apparatus comprising: a stator including a coil on outer peripheral direction; a rotor having a magnet so as to correspond to the coil and rotated by an electromagnetic interaction between the coil and the magnet; and a capstan shaft fixed on the rotor to be rotated integrally with the rotor and having one side installed so as to cohere with a pinch roller taking a tape therebetween to drive the tape with the pinch roller, wherein the magnet of a predetermined shape is provided to apply a magnetic force eccentrically for electromagnetic force generated on the coil so that a predetermined thrust can be functioned to one direction of the capstan shaft between upper and lower directions of the shaft.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In a magnetic recording and reproducing apparatus according to the present invention, a tape wound off from a feed reel of a tape cassette is contacted to a full width erase head for erasing video and voice control signals recorded on the tape all when the tape is in the recording mode, to a video head drum for recording/reproducing video signals, to an audio head for recording/reproducing voice signals, to a control head for recording/reproducing control signal on the tape so that the tape can be driven in a constant speed, and then, wound on a take-up reel of the tape cassette.

In the magnetic recording and reproducing apparatus as above, a capstan motor 150 and a pinch roller 154 are disposed for driving the tape, and the capstan motor 150 will be described with reference to FIGS. 3A and 3B as follows.

Figure 1:
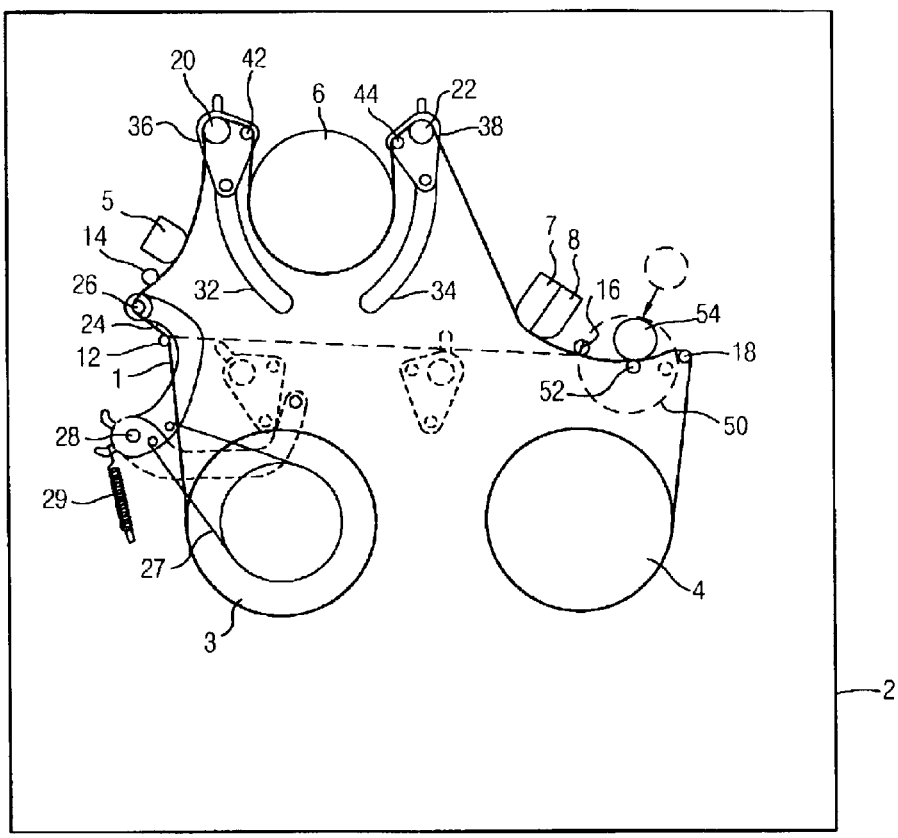
FIG. 1 is a block diagram showing a tape drive of a general magnetic recording and reproducing apparatus.
Figure 2A:
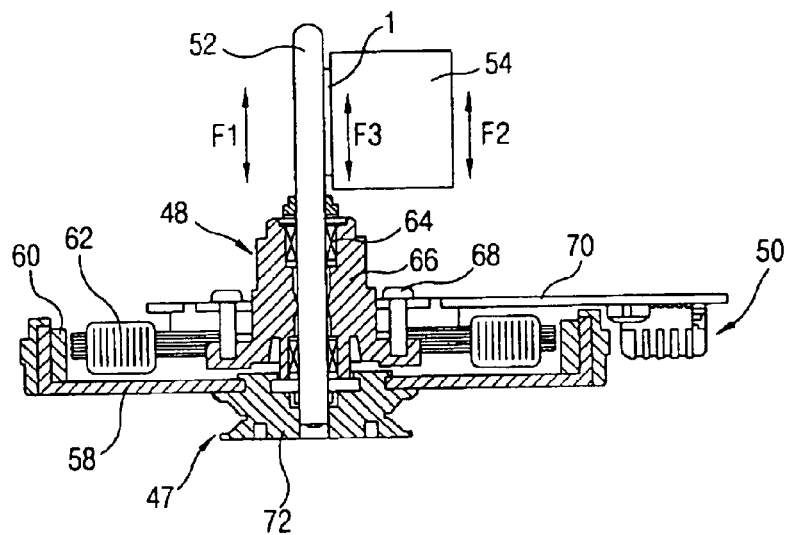
FIGS. 2A and 2B are longitudinal cross sectional views showing the structure of a capstan motor according to the conventional art.
Figure 2B:
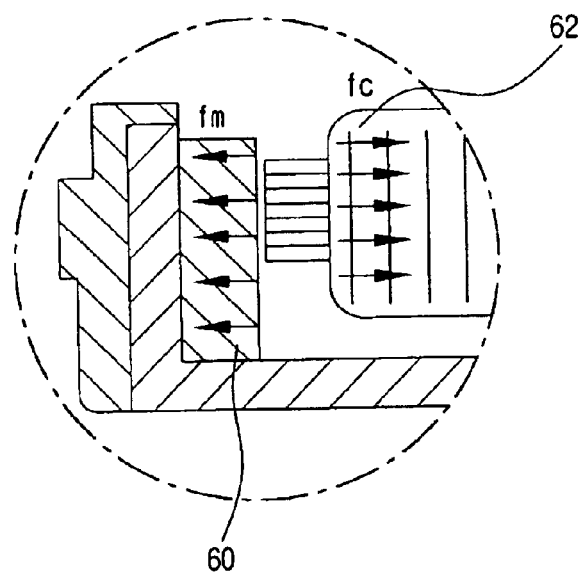
Figure 3A:
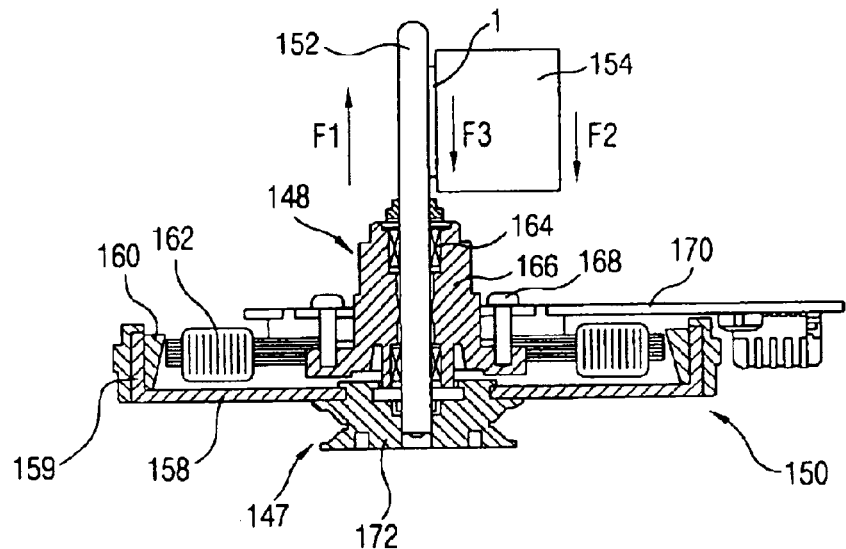
FIGS. 3A and 3B are longitudinal cross sectional views showing a capstan motor according to an embodiment of the present invention.
Figure 3B:
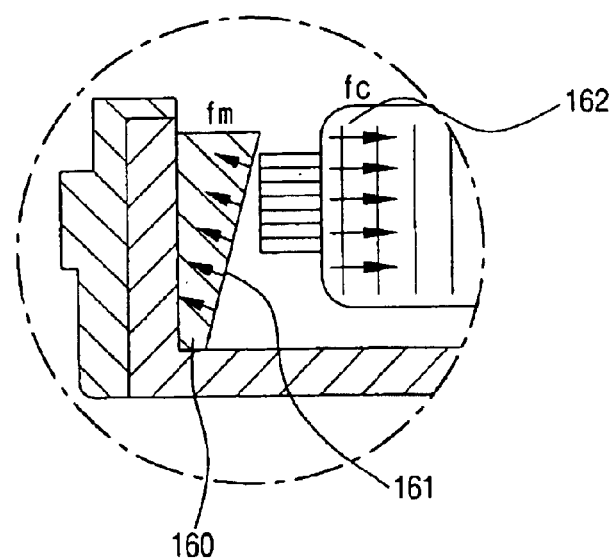

FIGS. 3A and 3B are longitudinal cross sectional views showing the capstan motor for the magnetic recording and reproducing apparatus according to an embodiment of the present invention.

The capstan motor 150 of the magnetic recording and reproducing apparatus according to the embodiment of the present invention comprises a rotor 147 and a stator 148 in brief.

The rotor 147 comprises a rotor case 158, a magnet 160 fixedly attached on inner side surface of a yoke portion 159 which is protrusively formed on periphery of the rotor case 158 for forming a magnetic field required to rotate the capstan motor 150, a pulley 172 fixed on lower center of the rotor case 158 and rotated integrally with the rotor case 158 for transmitting force for driving reel rotation of a magnetic tape, and a capstan shaft 152 fixedly press-fitted on a center of the pulley 172 and formed to be cohered with the pinch roller 154 taking the tape 1 therebetween.

Herein, the capstan shaft 152 is an output shaft of the capstan motor 150, and the driving direction of the tape 1 is decided by the rotating direction of the capstan shaft 152.

The stator 148 comprises a frame 166, on which a substrate 170 is fixed by a coupling bolt 168, having bearings 164 respectively installed on inner upper and inner lower sides thereof for supporting the rotating operation of the capstan shaft 152, and an armature coil 162 fixed on periphery of the frame 166 to face the magnet 160 of the rotor 147 for rotating the rotor 147 by electromagnetic interaction with the magnet 160.

Herein, the capstan motor 150 is formed so that an air gap between the magnet 160 and the coil 162 is reduced as going toward the upper side from the lower side.

That is, a corresponding surface of the magnet 160 which faces the coil 162 is formed to have a predetermined angle for the capstan shaft 152, and at that time, an area of the cross section of the magnet 160 is enlarged as going toward the upper part compared to that on lower part.

Therefore, a direction of the magnetic force (fm) generated on the magnet 160 is formed to cross the corresponding surface 161 of the magnet 160 as shown in FIGS. 3A and 3B, and therefore, the direction of magnetic force (fm) does not cross the shaft direction of the capstan shaft 152, but has a predetermined angle.

Here, the corresponding surface 161 of the magnet 60 may be formed straightly as shown as in FIGS. 3A and 3B or may be formed to have other shapes.

Operations of the capstan motor 150 according to the embodiment of the present invention will be described as follows.

When electric power is applied to the coil 162, electric force is generated on the coil 162 to rotate the rotor 147.

In addition, the capstan shaft 152 and the pinch roller 154 are cohered taking the tape 1 therebetween to compress the tape 1, and these are rotated by the rotating force of the capstan motor 150, and thereby, to drive the tape 1 at a constant speed with a constant tensile force.

At that time, as the air gap between the magnet 160 and the coil 162 is reduced gradually from the lower side toward the upper side, a flux generated by the magnetic force of the magnet 160 and by the electromagnetic force of the coil 162 is eccentric to the upper side of the magnet 160 compared to the lower side.

Therefore, an attractive force is applied toward the shaft direction by an electromagnetic equilibrium principle for maintaining the balance of the magnetic force of the magnet 160 and the electromagnetic force of the coil 162, and therefore, the magnet 160 becomes to have a property to move upward for the fixed coil 162 by the attractive force.

That is, when the electric power is applied to the coil 162, the direction of the magnetic force (fm) generated from the magnet 160 of the rotor 147 is to have a predetermined angle for the direction of the electromagnetic force (fc) of the coil 162 in the stator 148. In addition, component of the direction crossing the length direction of the capstan shaft 152 among the magnetic force of the magnet 160 is interacted with the electromagnetic force of the coil 162 to rotate the rotor 147, and component of length direction of the capstan motor 150 among the magnetic force provides the capstan shaft 152 with thrust F1.

In addition, the capstan shaft 152 is rotated as cohered more and more to the bearing 164 by a counteraction for the thrust F1 in shaft direction generated between the magnet 160 and the coil 162.

Meanwhile, the thrust F2 is applied to the pinch roller 154 toward an opposite direction of the thrust F1 of the capstan shaft 152, Moreover, since a frictional force between the tape 1 and the pinch roller 154 is greater than that between the tape 1 and the capstan shaft 152, the thrust F3 is applied to the tape 1 in the same direction with the thrust F2 of the pinch roller 154.

Therefore, the vibration in shaft direction of the capstan shaft 152, which is generated due to mechanical vibration generated when the rotor 147 is rotated or due to outer element generated when the capstan shaft 152 is cohered with the pinch roller 154, can be prevented.

Since the capstan motor 150 according to the embodiment of the present invention described above provides the capstan shaft 152 with the thrust in the shaft direction to prevent the capstan shaft 152 from vibrating in shaft direction, the tape 1 can be driven stably, and therefore, reliability for recording and reproducing can be improved.

Figure 4A:
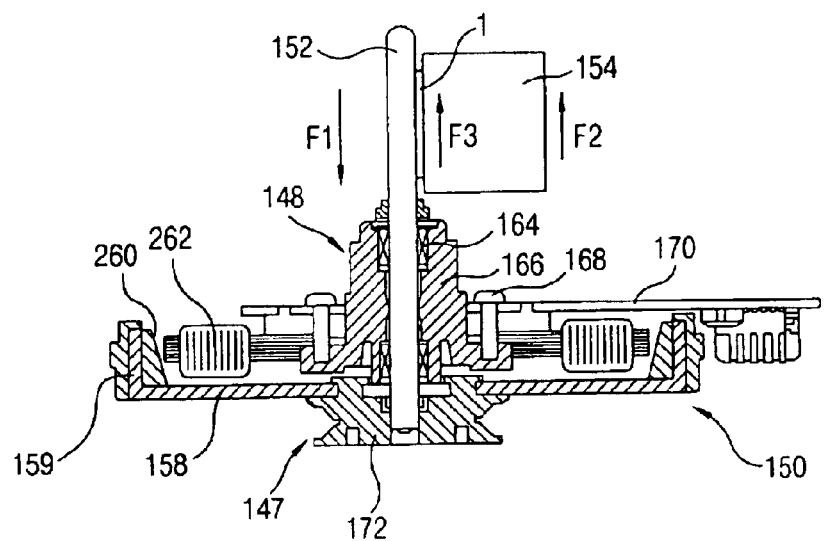
FIGS. 4A and 4B are enlarged views showing a magnet of a capstan motor according to another embodiment of the present invention.
Figure 4B:
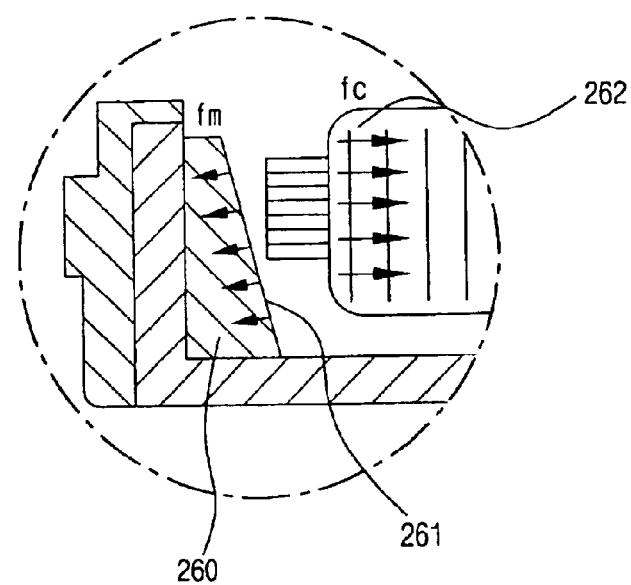

On the other hand, in the capstan motor 150 according to the above embodiment of the present invention, the area of the corresponding surface 161 on the magnet 160 corresponding the coil 162 is formed to be enlarged as going toward the upper part, however, as shown in FIGS. 4A and 4B, the corresponding surface 261 of the magnet 260 corresponding to the coil 262 can be formed to be slant so that the area can be enlarged as going toward the lower part.

In case of the another embodiment of the present invention as above, the attractive force toward the lower part is applied to the rotor, and therefore, the direction of the thrust in shaft direction provided to the capstan shaft is applied differently from the above first embodiment, however, it is able to obtain the effects described in the above first embodiment.

In the capstan motor for the magnetic recording and reproducing apparatus constructed as above according to the present invention, the corresponding surface of the magnet facing the coil is formed to be slant as a predetermined angle, and the constant force can be applied to the capstan shaft in length direction by using the electromagnetic equilibrium between the magnetic force generated on the rotor and the electromagnetic force generated on the stator, and thereby, the vibration of the capstan shaft in shaft direction caused by the mechanical vibration can be prevented to drive the tape stably and the reliability for reproducing and recording quality of the magnetic recording and reproducing apparatus can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A capstan motor for a magnetic recording and reproducing apparatus, comprising:
   a stator including a coil disposed on an outer peripheral direction thereof;
   a rotor having a magnet to correspond to the coil and rotated by an electromagnetic interaction between the coil and the magnet; and
   a capstan shaft rotated integrally with the rotor as fixed on the rotor and installed so that one side of the capstan shaft is cohered with a pinch roller taking a tape therebetween to drive the tape with the pinch roller,
   wherein the magnet has a corresponding surface facing the coil formed to be slanted at a predetermined angle to apply magnetic force of the magnet eccentrically for an electromagnetic force generated on the coil so that a predetermined thrust can be applied to the capstan shaft toward one direction between upper and lower directions of the shaft direction.

2. The motor of claim 1, wherein the magnet is formed to have a cross section which is enlarged gradually from a lower part toward an upper part.

3. The motor of claim 2, wherein the surface corresponding to the coil of the magnet is slanted straightly.

4. The motor of claim 1, wherein the magnet is formed to have a cross section which is enlarged gradually from an upper part toward a lower part.

5. The motor of claim 4, wherein the surface corresponding to the coil of the magnet is slanted straightly.

6. A motor comprising:
   a stator including a coil disposed on an outer peripheral direction thereof;
   a rotor having a magnet to correspond to the coil and rotated by an electromagnetic interaction between the coil and the magnet; and
   a driving shaft rotated integrally with the rotor as fixed on the rotor,
   wherein the magnet has a corresponding surface facing the coil formed to be slanted at a predetermined angle to apply magnetic force of the magnet eccentrically for an electromagnetic force generated on the coil so that a predetermined thrust can be applied to the driving shaft toward one direction between upper and lower directions of the shaft direction.

7. The motor of claim 6, wherein the magnet is formed to have a cross section which is enlarged gradually from a lower part toward an upper part.

8. The motor of claim 7, wherein the surface corresponding to the coil of the magnet is slanted straightly.

9. The motor of claim 6, wherein the magnet is formed to have a cross section which is enlarged gradually from an upper part toward a lower part.

10. The motor of claim 9, wherein the surface corresponding to the coil of the magnet is slanted straightly.

11. A motor comprising:

a stator including a coil disposed on outer peripheral direction thereof;

a rotor having a magnet which is disposed to have an air gap from the coil of the stator, the rotor rotated by an electromagnetic interaction between the coil and the magnet; and a driving shaft rotated integrally with the rotor as fixed on the rotor, wherein the magnet is slanted to have a relative angle corresponding to the coil so that the air gap between the coil and the magnet is reduced or increased in an axial direction of the driving shaft.

12. A motor comprising:

a stator including a coil disposed on an outer peripheral direction thereof;

a rotor having a magnet which is disposed to have air gap from the coil of the stator, the rotor rotated by an electromagnetic interaction between the coil and the magnet; and a driving shaft rotated integrally with the rotor as fixed on the rotor, wherein the air gap between the coil and the magnet is reduced or increased in an axial direction shaft, and, wherein the magnet is formed to have a cross section which is gradually enlarged in the axial direction of the driving shaft.

13. The motor of claim 11, wherein the surface of the magnet facing to the coil is formed as a straight shape.

* * * * *